United States Patent [19]
Brown

[11] Patent Number: 5,215,357
[45] Date of Patent: Jun. 1, 1993

[54] REGULATOR SUPPLY VALVE FOR ADAPTIVE BRAKING AND TRACTION CONTROL SYSTEMS

[75] Inventor: G. Emerson Brown, Niles, Mich.

[73] Assignee: Allied-Signal Inc., Morristown, N.J.

[21] Appl. No.: 898,592

[22] Filed: Jun. 15, 1992

Related U.S. Application Data

[62] Division of Ser. No. 569,877, Aug. 17, 1990, Pat. No. 5,137,339.

[51] Int. Cl.$^5$ .............................................. B60T 13/18
[52] U.S. Cl. ............................... 303/113.2; 303/116.1; 180/197
[58] Field of Search ........ 303/113 R, 113 TR, 116 R, 303/116 SP, 119 R, 119 SV, 93, 110; 180/197

[56] References Cited

U.S. PATENT DOCUMENTS

| | | | |
|---|---|---|---|
| 4,175,794 | 11/1979 | Pauwels | 303/105 |
| 4,602,824 | 7/1986 | Nishimura et al. | 303/100 |
| 4,869,560 | 9/1989 | Nishii | 303/114 R |
| 4,874,207 | 10/1989 | Nishii et al. | 303/52 |
| 4,902,075 | 2/1990 | Uno et al. | 303/14 |
| 4,934,762 | 6/1990 | Sato | 303/117 |

FOREIGN PATENT DOCUMENTS

| | | |
|---|---|---|
| 0285253 | 10/1988 | European Pat. Off. |
| 0320943 | 6/1989 | European Pat. Off. |
| 3831426 | 9/1987 | Fed. Rep. of Germany |
| 3821225 | 2/1989 | Fed. Rep. of Germany |
| 3908151 | 10/1989 | Fed. Rep. of Germany |
| 3943168 | 7/1990 | Fed. Rep. of Germany |
| 60-33157 | 2/1985 | Japan |
| 62-71749 | 4/1987 | Japan |
| 2056004 | 3/1981 | United Kingdom |
| 2161231 | 1/1986 | United Kingdom |
| 2192684 | 1/1988 | United Kingdom |
| 2224088 | 4/1990 | United Kingdom |

*Primary Examiner*—Robert J. Oberleitner
*Assistant Examiner*—Alfred Muratori
*Attorney, Agent, or Firm*—Larry J. Palguta; William N. Antonis

[57] ABSTRACT

The regulator supply valve (100, 101, 200, 300, 400, 500, 600, 740) of the present invention provides regulated fluid pressure for adaptive braking and traction control systems (10, 710) operation. The regulator supply valve (100, 101, 200, 300, 400, 500, 600) and system (10) may be supplied as an add-on feature for a standard braking system. During adaptive braking system operation, pressure from a chamber (28, 30; 718, 716) of a master cylinder (12, 712) causes the regulator supply valve (100, 101, 200, 300, 400, 740) to communicate a pressure source (35, 720) with modulators 41, 42; 51, 52; 61, 62, 71; 746, 748, 752; 746', 748', 752') for respective wheel brakes (40, 50, 60, 70; 750, 760). During traction control operation, an electronic control unit (200, 700) of the system (10, 710) activates a solenoid (104, 106; 204, 206; 304, 306, 404, 406; 504, 506; 604, 606; 783, 784) to cause the regulator supply valve (100, 101, 200, 300, 400, 500, 600, 740) to open controllably the communication between the pressure source (35, 720) and modulator valves (41, 42; 51, 52; 61, 62, 71; 746, 748, 752; 746', 748', 752'). The regulator supply valve (740) may be located within a boosted master cylinder (712) such that it is activated during both adaptive braking and traction control operation to enable the pressure source (720) to communicate with modulators (746, 748, 752; 746', 748', 752').

18 Claims, 4 Drawing Sheets

REGULATOR SUPPLY VALVE FOR ADAPTIVE BRAKING AND TRACTION CONTROL SYSTEMS

This is a divisional of copending application Ser. No. 07/569,877 filed on Aug. 17, 1990 now U.S. Pat. No. 5,139,339.

The present invention relates generally to a regulator supply valve for adaptive braking and traction control systems, and in particular to a supply valve which integrates both adaptive braking and traction control regulated pressure supply functions.

Numerous adaptive braking and traction control systems have been provided previously. It is advantageous to provide a combination adaptive braking and traction control system which can be implemented in a vehicle as an add-on feature to the standard braking system. The adaptive braking and traction control system must be compatible with a standard master cylinder, while providing both adaptive braking and traction control functions. Some accumulator supplied adaptive braking systems require that a regulator valve meter the high pressure accumulator supply provided to the brakes through the modulator valves during cycling. The regulator keeps the supply pressure equal to the applied master cylinder pressure. Some traction control systems also require a supply valve to meter the accumulator pressure supplied to the modulators during traction control cycling. Such a valve typically provides a high pressure level without a master cylinder pressure being applied to the valve. It may be desirable to limit this traction control pressure to a set maximum level. It would be highly advantageous to combine both the adaptive braking and traction control systems and the related supply valves so that both functions could be provided by the same valve. This can lead to reduced components and complexity for the system, while reducing the internal circuits of the hydraulic assembly.

The present invention provides a solution to the above problems by providing an adaptive braking system with traction control, comprising master cylinder means having reservoir means and communicating with at least one wheel brake of the vehicle via modulator means, pressure source means communicating with said reservoir, and a regulator supply valve communicating with said pressure source means, modulator means, and master cylinder means, wherein during adaptive braking system operation pressure from a chamber of said master cylinder causes said regulator supply valve to communicate pressure from said pressure source means to said modulator means, and during traction control operation the regulator supply valve is activated by said control means to communicate said pressure source means with said modulator means.

One way of carrying out the invention is described in detail with reference to the drawings which illustrate embodiments in which.

Figure 1:
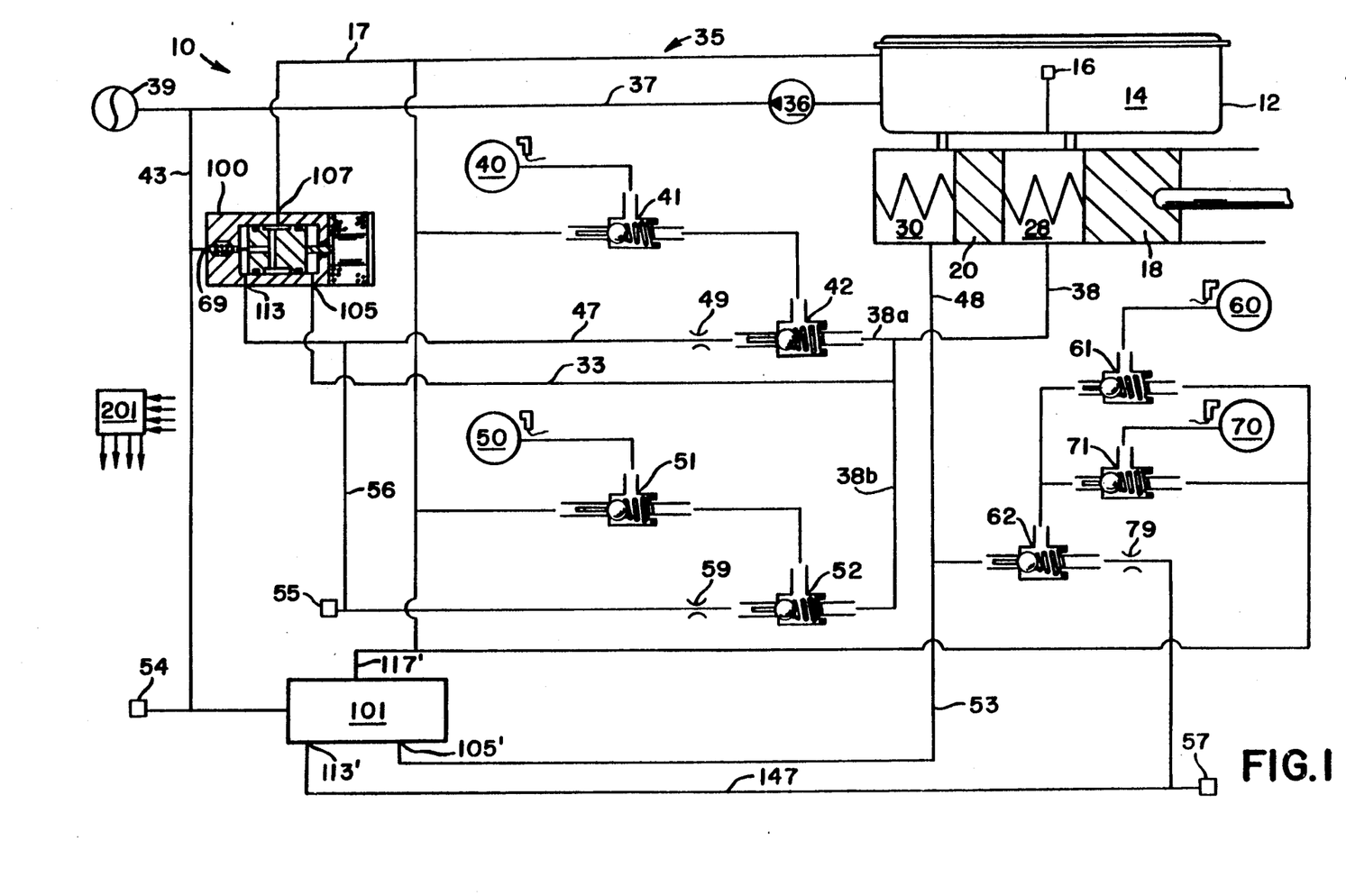
FIG. 1 is a schematic illustration of an adaptive braking and traction control system with regulator supply valve of the present invention.

FIG. 1 is a schematic representation of an adaptive braking and traction control system identified generally by reference numeral 10. System 10 includes master cylinder 12 which includes reservoir 14 with fluid level switch 16, primary piston 18 and secondary piston 20, primary pressure chamber 28 and secondary pressure chamber 30, with primary pressure chamber 28 communicating via lines 38 and 38a with right front wheel brake 40 and via lines 38 and 38b with left front wheel brake 50, and secondary pressure chamber 30 communicating via line 48 with right rear wheel brake 60 and left rear wheel brake 70. The system includes for right front wheel brake 40 an electrically operated decay valve 41 and electrically operated isolation and build valve 42. Left front wheel brake 50 includes associated decay valve 51 and isolation and build valve 52. Right rear wheel brake 60 includes associated decay valve 61 and rear isolation and build valve 62. Likewise, left rear wheel brake 70 includes associated decay valve 71 and rear isolation and build valve 62. The sets of decay and isolation and build valves each comprise means for modulating fluid pressure to the respective wheel brake. Pressure source 35 comprises pump 36 and an accumulator 39, the pump receiving fluid from reservoir 14 and communicating it via line 37 with accumulator 39 and via line 43 with an accumulator switch or transducer 54 and a pair of regulator supply valves 100 and 101. Regulator supply valves 100 and 101 are identical and contain the same inlet and outlet ports in relation to the respective front and rear wheel brakes. System 10 may also be arranged to have a single regulator supply valve for either the front or rear brakes, while the other regulator supply valve would not include a solenoid and be operative for adaptive braking. Primary pressure transducer 55 is located on the downstream side of regulator supply valve 100 for the front wheel brakes, as is secondary pressure transducer 57 which is located downstream of the associated regulator supply valve 101 for the rear wheel brakes.

All of the regulator supply valves disclosed herein have a hydraulic reaction force which acts against the displacement of the armature of the supply valve solenoid in order to effect a regulated output pressure. This is accomplished by having the armature displace either a sealed piston (FIGS. 1–3, 5, 6, 8) or a sealed valve rod (FIGS. 4 and 7).

Figure 2:
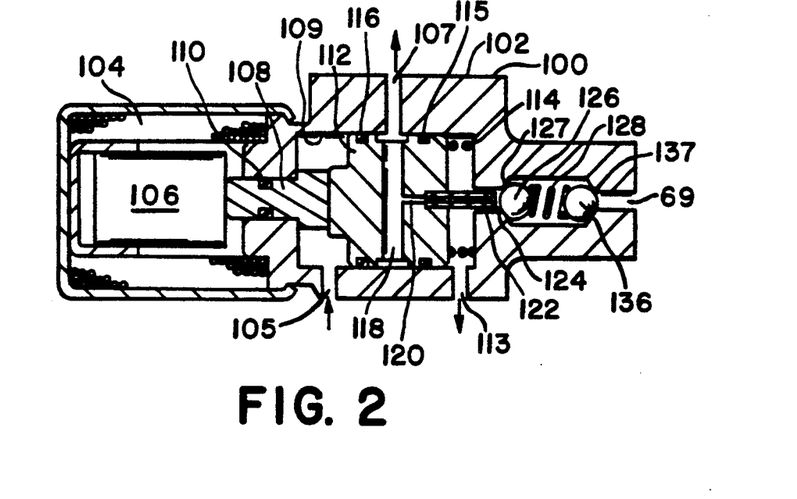
FIG. 2 is a section view of a regulator supply valve of the present invention.

Referring to FIG. 2, regulator supply valve 100 is described in detail. Supply valve 100 includes valve body 102 which houses coil 104 disposed about armature 106. Armature 106 abuts valve rod 108 having optional seal 110 thereabout. Valve body 102 includes stepped bore 109 including therein supply piston 112. Piston 112 is biased by resilient means 114 toward armature 106. Supply piston 112 includes thereabout a pair of seals 115, 116 and has transverse opening 118 communicating with longitudinal opening 120. Longitudinal opening 120 extends into axial extension 122 which terminates in seat 124. Seat 124 is disposed adjacent ball valve 126 which is biased by spring means 128 extending between ball valve 126 and ball valve 136. Ball valve 126 closes ball valve seat 127 and ball valve 136 closes ball valve seat 137. Valve body 102 includes inlet port 105 which communicates with the master cylinder via lines 33 and 38, return port 107 which communicates with reservoir 14 via return line 17, and outlet port 113 which communicates with line 47 that includes orifice 49 and communicates with isolation and build valve 42. Likewise, line 47 communicates with line 56 and orifice 59 which communicates with isolation and build valve 52. Valve body 102 includes high pressure inlet port 69 which receives fluid pressure via line 43 from pressure source 35. Regulator supply valve 101 for rear wheels 60, 70 includes the same connections and communicates outlet port 113' with line 147 and orifice 79 which communicates with rear isolation and build valve 62. The system illustrated is a typical split system wherein the modulator means comprising valves 61, 62, 71 is utilized for the rear wheel brakes.

During normal braking, the vehicle operator depresses the brake pedal which displaces primary and secondary pistons 18, 20. Pressure generated within primary chamber 28 is communicated via lines 38, 38a and 38b to front wheel brakes 40, 50 via the respective unactivated isolation/build and decay valves. Pressure from secondary master cylinder chamber 30 is communicated via line 48 to rear wheel brakes 60, 70. Pressure from the master cylinder chambers is also communicated via lines 33 and 53 to the respective regulator supply valves and does not displace significantly the respective supply pistons because pressure outputs from valves 100, 101 through lines 47, 56, and 147 are blocked by the respective isolation and build valves 42, 52 and 62.

During adaptive braking system operation, electronic control unit 201 senses an imminent wheel skid and immediately energizes the isolation and build valves to isolate the master cylinder from the wheel brakes. Concurrently, fluid pressure from the pressure chambers of the master cylinder which is communicated to supply regulator valves 100, 101 via respective lines 33 and 53 causes the supply pistons to be displaced, as a result of the respective isolation and build valves now permitting fluid flow to the respective wheel brakes. Decay valves 41, 51, 61, 71 are energized to stop the pressure build flow from the regulator valves and decay brake pressure to the reservoir. Referring to supply valve 100 for the front wheel brakes, the master cylinder pressure received at inlet port 105 causes supply piston 112 to be displaced and engage valve seat 124 with ball valve 126. This closes off the communication of any fluid pressure to outlet port 107 which communicates with return line 17. Further movement of supply piston 112 causes ball valve 126 to be moved from seat 127 and permit fluid pressure from pressure source 35 to be communicated past ball valves 136 and 126 to outlet port 113, line 47, orifice 49 and the now closed isolation/open build valve 42. Fluid flows from build valve 42 through decay valve 41 and to right front wheel brake 40. In the same manner, fluid from supply regulator valve 100 flows via line 56 to orifice 59, through closed isolation/open build valve 52, decay valve 51, and left front wheel brake 50. Supply valve 101 operates in the same manner to supply regulated fluid pressure to rear wheel brakes 60, 70 via closed isolation/open build valve 62. In valve 100, supply piston 112 moves ball valve 126 off seat 127, and the pressure supplied to outlet port 113 will increase until the pressure on supply piston 112 is basically equal to the pressure received from the master cylinder and transmitted to inlet port 105. At this point, supply piston 112 is held with both ball valve 126 seated on seat 124 and ball valve 126 seated on valve seat 127 so that further fluid pressure is not transmitted to outlet port 113 nor is any fluid pressure transmitted to return port 107. If the master cylinder pressure is reduced, supply piston 112 will move toward the right in FIG. 2 and permit fluid pressure to be transmitted to return port 107 and return line 17, until pressures are again equal.

During traction control operation by system 10, the vehicle operator is not depressing the brake pedal and thus fluid pressure is not generated within pressure chambers 28, 30 of master cylinder 12. Coil 104 of valve 100 is actuated to cause armature 106 to be displaced against valve rod 108 and effect displacement of supply piston 112. This results in a predetermined supply pressure being provided to lines 47 and 56 to the respective modulator means, and is dependent of the ECU 201 controllable force exterted by armature 106 on rod 108 and piston 112 and on the outer diameter size of supply piston 112. When coil 104 is deenergized, the supply piston moves away from ball valve 126 and permits fluid pressure within lines 47 and 56 to be communicated via longitudinal opening 120 and transverse opening 118 to outlet port 107 and return line 17. The operation of supply valve 101 is the same.

Figure 3:
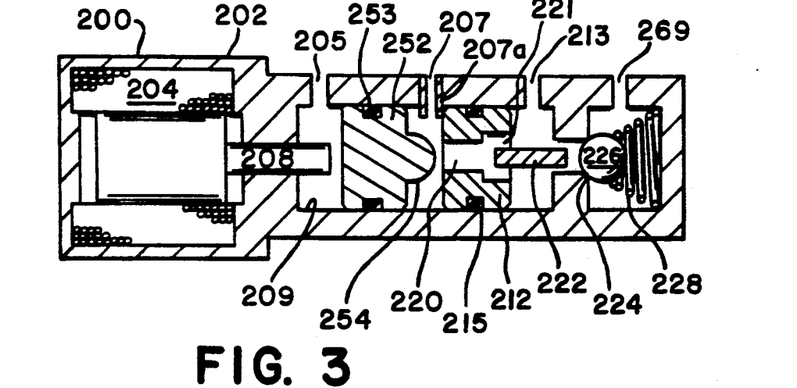
FIG. 3 is a section view of an alternative regulator supply valve of the present invention.
Figure 4:
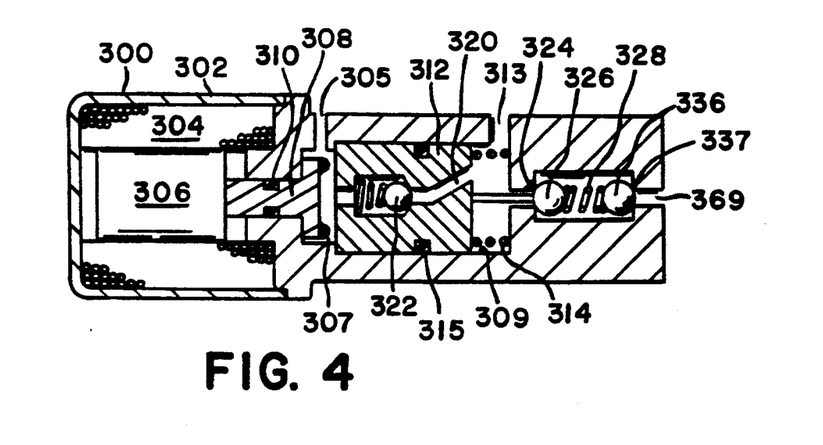
FIG. 4 is a section view of another alternative regulator supply valve of the present invention.

Referring now FIG. 3, an alternative embodiment of the regulator supply valve of the present invention is illustrated. Regulator supply valve 200 includes regulator valve body 202 which includes coil 204 and armature 206 which engages valve rod 208. Valve body 202 includes inlet port 269 communicating with the pressure source 35, a regulated outlet port 213 communicating with lines 47 and 56, and master cylinder inlet port 205. Regulator valve body 202 includes stepped bore 209 which has supply piston 212 and seal 215. Supply piston 212 includes extension 222 and through opening 220 which communicates with end holes 221 disposed in spaced-apart alignment about extension 222. Ball valve 226 is biased by spring means 228 against valve seat 224. Rod 208 is spaced a distance apart from auxiliary or pressure piston 252 which has seal 253 thereabout and a head 254 for engaging an end of supply piston 212 and closing through opening 220. Regulator supply valve 200 operates essentially the same as described above. Pressure from the master cylinder is received in the stepped bore 209 and causes auxiliary piston 252 to move the right so that head 254 engages supply piston 212 to close off the end opening of through opening 220. As long as the associated isolation and build valves are in the deenergized positions illustrated in FIG. 1, regulator supply valve 200 cannot transmit fluid pressure via outlet port 213 to the associated wheel brakes. However, during adaptive braking system operation, the associated isolation valves are closed which corresponds to an opening of the associated build valves so that fluid pressure from the pressure chambers of the master cylinder causes auxiliary piston 252 to engage and displace supply valve 212 and cause extension 222 to move ball valve 226 from seat 224 so that fluid pressure is communicated between inlet port 269 and outlet port 213. The pressure supplied to outlet port 213 will increase until the pressure on supply piston 212 is basically equal to the pressure received from the master cylinder and transmitted to inlet port 205. At this point, supply piston 212 is positioned so that ball valve 226 is seated on valve seat 224 such that further fluid pressure is not transmitted to outlet port 213 nor is any fluid pressure transmitted to return port 207. If the master cylinder pressure is reduced, supply piston 212 will move toward the left in FIG. 3 to engage stop 207A and permit fluid pressure to be transmitted through through opening 220 as soon as auxiliary piston 252 moves farther to the left to disengage head 254 and permit fluid flow to return port 207 and the associated return line.

During traction control operation by system 10, the vehicle operator is not depressing the brake pedal and thus fluid pressure is not generated within pressure chambers 28, 30 of master cylinder 12. Coil 204 of valve 200 is actuated to cause armature 206 to be displaced against valve rod 208 and effect displacement of auxiliary and supply pistons 252 and 212. This results in a predetermined supply pressure being provided to outlet port 213. When coil 204 is deenergized, supply piston 212 and auxiliary piston 252 move away from ball valve 226 and then separate as pressure communicated from outlet port 213 through the through opening 220 and acting against head 254 causes auxiliary piston 252 to separate from supply piston 212 after piston 212 moves to engage stop 207A. The fluid pressure enters the auxiliary or return chamber 211 and exits via outlet port 207 to the reservoir 14.

Referring now to FIG. 4, another alternative embodiment of the regulator supply valve of the present invention is illustrated. Regulator supply valve 300 includes regulator valve body 302 which includes coil 304 and armature 306 which engages valve rod 308 having seal 310. Valve body 302 includes inlet port 369 communicating with the pressure source, a regulated outlet port 313, and master cylinder inlet port 305. Regulator valve body 302 includes stepped bore 309 which has supply piston 312 with seal 315. Supply piston 312 is biased by resilient means 314. Supply piston 312 includes through opening 320 which includes spring biased ball check valve 322. Ball valve 326 is biased by spring means 328 against valve seat 324. Ball valve 336 is biased by spring means 328 against valve seat 337. Rod 308 is spaced a distance apart from piston 312 and includes end seal 307. Regulator supply valve 300 operates the same as described above; however, during the release phase the fluid pressure present at outlet port 313 is communicated past ball check valve 322 (which opens because of the receding fluid pressure within the master cylinder chambers and communicating with inlet port 305), past retracted rod 308 and seal 307 and is transmitted toward the master cylinder via port 305. In this embodiment of the invention, the regulated pressure output is released to the master cylinder rather than toward the reservoir. The valve functions in all other respects the same as described above for valve 100. It is important to note that valve 300 should be utilized with certain types of master cylinders which accept the transmission of high fluid pressure back to the master cylinder wherein the high pressure would not deteriorate or damage the pressure seals of the master cylinder pistons as they move past the return openings communicating with the reservoir. By utilizing valve 300 with the appropriate type of master cylinder, this problem would be prevented. An additional possible problem of the loss of a reference pressure from the master cylinder occurring because the master cylinder pistons may be full stroked, can be avoided by utilizing dual regulators plus a master cylinder travel switch as a solution, in order to avoid a reduction of braking pressure during adaptive braking system cycling.

Figure 5:
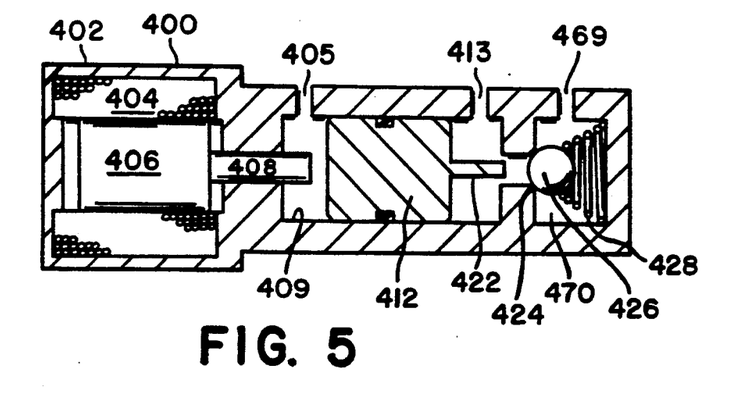
FIG. 5 is a section view of a third alternative embodiment of the regulator supply valve.

Referring now to FIG. 5, a further alternative embodiment of the regulator supply valve of the present invention is illustrated. Regulator supply valve 400 includes regulator valve body 402 which includes coil 404 and armature 406 which engages valve rod 408. Valve body 402 includes inlet port 469 communicating with the pressure source, a regulated outlet port 413, and master cylinder inlet port 405. Regulator valve body 402 includes stepped bore 409 which has a supply chamber 470 containing ball valve 426 which is biased by spring means 428 against valve seat 424. During normal braking, pressure from the associated master cylinder pressure chamber is transmitted to the master cylinder inlet port where it acts against the back side of supply piston 412. As long as the associated isolation and build valves are in the deenergized positions illustrated in FIG. 1, regulator supply valve 400 cannot transmit fluid pressure via outlet port 413 to the associated wheel brakes. However, during adaptive braking system operation, the associated isolation valves are closed which corresponds to an opening of the associated build valves so that fluid pressure from the pressure chambers of the master cylinder causes the supply piston to be displaced and cause extension 422 to move ball valve 426 from seat 424 so that fluid pressure is communicated between inlet port 469 and outlet port 413. The pressure supplied to outlet port 413 will increase until the pressure on supply piston 412 is basically equal to the pressure received from the master cylinder and transmitted to inlet port 405. At this point, supply piston 412 is positioned so that ball valve 426 is seated on valve seat 424 such that further fluid pressure is not transmitted to outlet port 413. If the master cylinder pressure is reduced, supply piston 412 will move toward the left so that extension 422 disengages from ball valve 426. This particular embodiment of the regulator supply valve does not include any pressure return from the adaptive braking system toward the master cylinder. Only the pressure generated in master cylinder supply chamber 470 is returned to the master cylinder via inlet port 405 and the associated connecting line.

During traction control operation, the vehicle operator is not depressing the brake pedal and thus fluid pressure is not generated within pressure chambers 28, 30 of master cylinder 12. Coil 404 of valve 400 is actuated to cause armature 406 to be displaced against valve rod 408 and effect displacement of supply piston 412. This results in a predetermined supply pressure being provided to outlet port 413. When coil 404 is deenergized, the fluid pressure within outlet chamber 411 displaces the supply piston 412, valve rod 408 and armature 406 toward the left so that ball valve 426 closes on seat 424.

Figure 6:
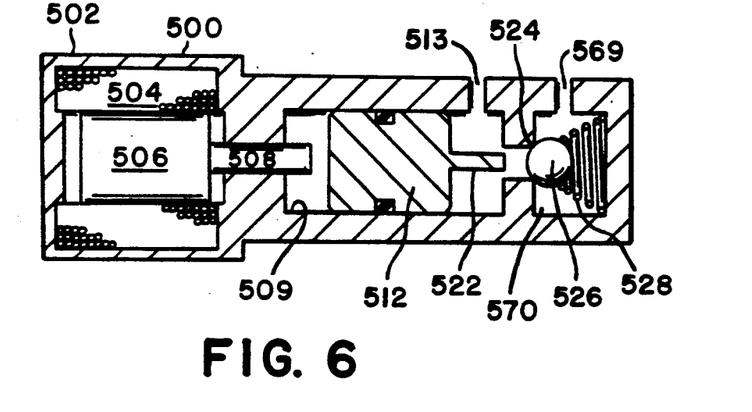
FIG. 6 is a section view of a regulator supply valve for a braking system having only traction control.
Figure 7:
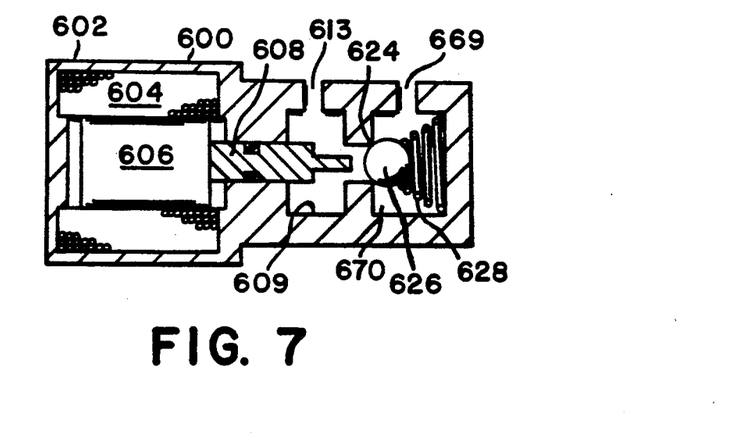
FIG. 7 is a section view of another regulator supply valve for a braking system having only traction control.

Referring to FIG. 6, an embodiment of a regulator supply valve of the present invention for an automotive braking system having only traction control is illustrated. Regulator supply valve 500 includes regulator valve body 502 which includes coil 504 and armature 506 which engages valve rod 508. Valve body 502 includes inlet port 569 communicating with the pressure source, and a regulated outlet port 513. Regulator valve body 502 includes stepped bore 509 which has a supply piston 512 with extension 522. Stepped bore 509 includes an inlet pressure chamber 570 that houses a spring 528 biasing ball valve 526 into engagement with valve seat 524. Regulator supply valve 500 is connected with braking system 10 which does not include adaptive braking but only traction control. When the ECU determines that excessive wheel slipage is imminent, the ECU will activate the associated isolation and build valves for the front wheels and operate the valve 500 by causing energization of coil 504 which displaces armature 506 and valve rod 508 against supply piston 512. As supply piston 512 is displaced by rod 508, the extension 522 pushes ball valve 526 off of seat 524 so that fluid pressure is communicated from the pressure source through inlet port 569 to regulated outlet port 513 for traction control operation. Regulator supply valve 500 does not include any return connections with either the master cylinder or reservoir of the system, but includes all of the advantages of the regulator supply valve of the present invention when utilized with a traction control only braking system.

Referring to FIG. 7, another embodiment of a regulator supply valve of the present invention for an automotive braking system having only traction control is illustrated. Regulator supply valve 600 includes regulator valve body 602 which includes coil 604 and armature 606 which engages valve rod 608. Valve body 602 includes inlet port 669 communicating with the pressure source, and a regulated outlet port 613. Regulator valve body 602 includes stepped bore 609 which receives valve rod 508 with an extension 622. Stepped bore 609 includes inlet pressure chamber 670 that houses spring 628 biasing ball valve 626 into engage with valve seat 624. Regulator supply valve 600 is connected with braking system 10 which does not include adaptive braking, but only traction control. When the ECU determines that excessive wheel slippage is imminent, the ECU will activate the associated isolation and build valves for the front wheels and operate valve 600 by causing energization of coil 604 which displaces armature 606 and valve rod 608 with extension 622 against ball valve 626. As ball valve 626 is displaced off of its seat 624, fluid pressure is communicated from the pressure source through inlet port 669 to regulated outlet port 613 for traction control operation. Regulator supply valve 600 does not include any return connections with either the master cylinder or reservoir of the system, but includes all of the advantages of the regulator supply valve of the present invention when utilized within a traction control only braking system. Additionally, regulator supply valve 600 eliminates the need for a separate piston such as piston 512 disclosed for the previous embodiment. Valve rod 608 includes seal 610 which retains fluid pressure within the right end of the valve so that a hydraulic reaction force acts against the movement of valve rod 608 toward the right when it is being displaced by coil 604 and armature 606. This enables the supply valve to effect a regulated output pressure for the associated braking system.

Figure 8:
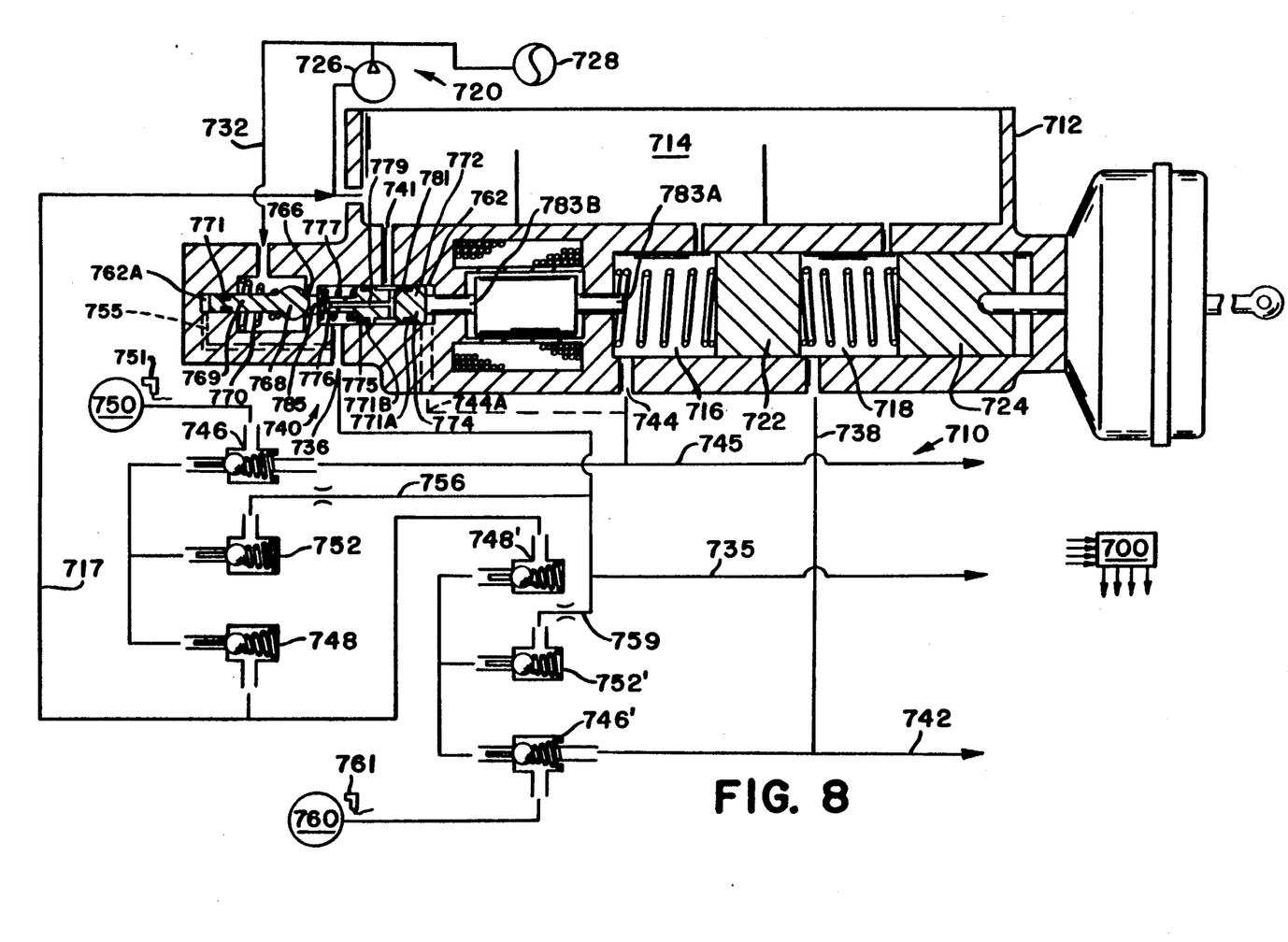
FIG. 8 is an illustration of a selected portion of an adaptive braking and traction control system containing a traction control supply valve integral with an end of a boosted master cylinder.

Referring to FIG. 8, a regulator supply valve 740 is disposed integral with a end of a vacuum boosted master cylinder 712 connected with an adaptive braking and traction control system 710. Vacuum booster 734 actuates primary and secondary pistons 724, 722, respectively, which are biased by return springs disposed in primary and secondary pressure chambers 718, 716. Master cylinder 712 includes stepped bore 762 which houses the supply valve 740 comprising a solenoid armature 783 having a coil winding 784 thereabout. Armature 783 includes extensions 783A and 783B. Extension 783A extends into secondary pressure chamber 716 where it may be engaged by secondary piston 722. Extension 783B extends into the portion of stepped bore 762 which houses piston valve 772. Piston valve 772 abuts extension 783B, and includes longitudinal through opening 779 communicating with transverse opening 781. Piston valve 772 includes large diameter valve section 774 and reduced diameter valve section 776 defining therebetween shoulder 775 biased by resilient means 777. Valve seat 785 of piston valve 772 may engage ball valve 768 biased by spring 770. Piston valve 772 includes a pair of seals 771A and 771B, and is located in a portion of stepped bore 762 which includes connection 741 with a reservoir 714 of master cylinder 712, and outlet connection 736 which communicates with the modulators (build valves, isolation valves and decay valves) associated with the wheel brakes of the vehicle. Alternatively, a secondary master cylinder output opening 744A (shown in dotted line) may be utilized to provide for improved bleeding of fluid through armature 783. Ball valve 768 is located within a portion of stepped bore 762 that includes pressure input line 732 that communicates with pressure source 720 comprising pump 726 and accumulator 728 of system 710. Optionally, ball valve 768 may include extension 769 having sealing means 771 thereabout. This would require bypass line connection 755 which permits fluid to be communicated between end portion 762A of stepped bore 762 and boost outlet line 736, so that ball valve 768 and extension 769 may move laterally within stepped bore 762.

Vacuum boosted master cylinder 712 communicates with adaptive braking and traction control system 710 by means of line 738 which communicates primary pressure chamber 718 with the left front wheel brake 760 and with the right rear wheel brake via line 742. The right rear wheel brake (not shown) would include an associated isolation valve (not shown) as does the not shown left rear wheel brake, both rear brakes able to receive metered braking pressure from a not shown build valve and able to have braking pressure withdrawn via a not shown decay valve. Secondary pressure chamber 716 communicates via line 744 with the right front wheel brake 750 and via line 745 with the not shown left rear wheel brake and isolation valve. Stepped bore 762 communicates with boost outlet line 736 that transmits fluid pressure to line 735 which communicates the fluid pressure with the not shown build valve for the rear wheel brakes. Likewise, line 736 transmits fluid pressure to lines 756 and 759 and build valves 752, 752' for the respective front wheel brakes. Right front wheel brake 750 includes an associated isolation valve 746 and decay valve 748 which communicates with return line 717. Likewise, left front wheel brake 760 includes an associated isolation valve 746' and decay valve 748' which communicates with return line 717. Each wheel brake includes an associated wheel speed sensor 751, 761.

During normal braking, master cylinder 712 is boosted by vacuum booster 734 in order to provide braking for the vehicle. The displacement of primary and secondary pistons 724, 722 by booster 734 will effect a displacement of piston valve 772. However, any fluid pressure released into line 736 by the engagement of valve seat 785 with ball 768 to move ball 768 away from valve seat 766, will not result in the fluid pressure being transmitted to the brakes because the pressure will be blocked by the closed build and isolation valves for the respective wheel brakes.

During adaptive braking, pressure generated within secondary pressure chamber 716 displaces piston valve 772 and ball valve 768 so that fluid pressure from source 720 is communicated to line 736. As valve seat 785 engages ball valve 768 to close off any fluid flow through longitudinal opening 779, piston valve 772 moves ball valve 768 off of seat 766 so that the high pressure fluid from source 720 is communicated through stepped bore 762 to line 736. The respective wheel speed sensors will have sensed an imminent skidding condition, and the ECU 700 will activate the respective isolation valves 746, 746' and the not shown isolation valves for the rear brakes, so that the master cylinder primary and secondary output lines 738, 744 cannot communicate with the wheel brakes. The ECU 700 will initially effect operation of the respective decay valves so that fluid pressure is decayed away from the respective wheel brakes in order Prevent the imminent skidding of the wheels. Then, as fluid pressure is needed to increase braking at the respective wheel brakes, the respective build valves are energized to permit fluid pressure to flow to the wheel brakes. The sets of isolation, build and decay valves comprise modulator means for the wheel brakes.

During traction control operation, the vehicle operator is not depressing the brake pedal and therefore vacuum booster 734 is not actuated. The ECU 700 would sense an excessive wheel slippage and effect actuation of coil winding 784 which causes displacement of armature 783. Armature 783 displaces piston valve 772 into engagement with ball valve 768. Engagement of piston valve 772 with ball valve 768 at valve seat 785 ensures that fluid pressure received via line 732 will not be communicated to reservoir 714 via connection 741. Piston valve 772 moves ball valve 768 off of ball valve seat 766 to permit fluid pressure in line 732 to be communicated to boost line 736 whereby it is transmitted to the build, isolation and decay valves associated with the wheel brakes of the vehicle. At the termination or end of traction control operation, traction control supply valve 740 is deenergized. Any pressure build within the system is communicated back through line 736 past now open valve seat 785 to through opening 779, transverse opening 781, and to reservoir 714 via connection 741.

Traction control supply valve 740 includes extension 783A so that should there be a master cylinder or system failure during braking that permits secondary piston 722 to be displaced toward endwall 716A of secondary pressure chamber 716, secondary piston 722 will engage extension 783A and displace piston valve 772 and ball valve 768 whereby pressurized fluid is communicated via line 736 to the brake system. This provides a fail safe actuation of the braking system in case of certain failures relating to the master cylinder of system.

I claim:

1. In an adaptive braking and traction control system having control means, comprising a master cylinder having at an end thereof a bore with a regulator supply valve which includes a piston valve and solenoid means, the bore at the regulator supply valve receiving fluid pressure from a pressure source and the bore having outlet connections with a reservoir of said master cylinder and with the adaptive braking and traction control system such that the supply valve is connected with at least one wheel brake via modulator means of said system, the bore including resilient means biasing the piston valve away from an inlet connection with said pressure source, an armature of the solenoid means including a pair of extensions, one extension engageable by a piston of the master cylinder and other extension engaged with said piston valve, actuation of said master cylinder during adaptive braking operation creating a fluid pressure that displaces the piston valve to communicate the pressure source with the modulator means, and during traction control operation the solenoid means of the supply valve actuated by the control means to displace said piston valve to provide a regulated fluid flow from the pressure source to said modulator means, the piston valve comprising a large diameter valve section slidable in said bore and a reduced diameter valve section, and an opening of the piston valve enabling fluid pressure from the outlet connection with the adaptive braking and traction control system to communicate with said reservoir after termination of traction control system operation.

2. The system in accordance with claim 1, wherein the opening of the piston valve is a longitudinal opening communicating with a transverse opening that communicates with said outlet connection with the reservoir.

3. In an adaptive braking and traction control system having control means, comprising a master cylinder having at an end thereof a bore with a regulator supply valve which includes a piston valve and solenoid means, the bore at the regulator supply valve receiving fluid pressure from a pressure source and the bore having outlet connections with a reservoir of said master cylinder and with the adaptive braking and traction control system such that the supply valve is connected with at least one wheel brake via modulator means of said system, actuation of said master cylinder during adaptive braking operation creating a fluid pressure that displaces the piston valve to communicate the pressure source with the modulator means, and during traction control operation the solenoid means of the supply valve actuated by the control means to displace said piston valve to provide a regulated fluid flow from the pressure source to said modulator means, the piston valve comprising a large diameter valve section slidable in said bore and a reduced diameter valve section, and a piston valve opening, the piston valve enabling release fluid flow from the outlet connection with the adaptive braking and traction control system to communicate directly through the piston valve opening to said reservoir after termination of traction control system operation, fluid flow through the piston valve opening always comprising release fluid flow to the reservoir.

4. The system in accordance with claim 3, wherein the bore includes resilient means biasing the piston valve away from an inlet connection with said pressure source.

5. The system in accordance with claim 3, wherein an armature of the solenoid means includes a pair of extensions, one extension engageable by a piston of the master cylinder and other extension engaged with said piston valve.

6. The system in accordance with claim 5, wherein the piston valve opening includes a transverse opening that communicates with said outlet connection with the reservoir.

7. The system in accordance with claim 3, wherein the supply valve includes ball valve means which includes a valve extension, the ball valve means engageable with a ball valve seat in order to prevent fluid pressure from communicating between said pressure source and the outlet connection with the adaptive braking and traction control system when said traction control system is not being operated.

8. The system in accordance with claim 7, wherein the valve extension is received within a portion of said stepped bore which communicate with a bypass line extending between said portion and said outlet connection with the adaptive braking and traction control system.

9. The system in accordance with claim 3, wherein the supply valve includes spring biased ball valve means, the ball valve means engageable with a ball valve seat in order to prevent fluid pressure from communicating between said pressure source and the outlet connection with the adaptive braking and traction control system.

10. The system in accordance with claim 9, wherein the piston valve opening begins at a valve seat of the piston valve, the valve seat of the piston valve engageable with said ball valve means.

11. In an adaptive braking system with traction control of a vehicle, comprising master cylinder means having reservoir means and communicating with at least one wheel brake of the vehicle via modulator means operated by control means, pressure source means communicating with said reservoir, and a regulator supply valve communicating with said pressure source means, modulator means, reservoir means, and master cylinder means, said regulator supply valve comprising a supply piston disposed within a stepped bore of said supply valve, the supply piston having a piston opening to permit fluid flow through the piston, wherein during adaptive braking system operation pressure from a chamber of said master cylinder causes said regulator supply valve to communicate pressure from said pressure source means to said modulator means, and during traction control operation the regulator supply valve is activated by said control means to communicate said pressure source means with said modulator means, the supply piston enabling release fluid flow from the modulator means of the adaptive braking system to communicate directly through the supply piston to said reservoir means after termination of traction control operation, fluid flow through the piston opening always comprising release fluid flow to the reservoir means.

12. The system in accordance with claim 11, wherein the regulator supply valve includes resilient means which biases the supply piston toward solenoid means of said supply valve.

13. The system in accordance with claim 11, wherein the supply valve includes a valve seat closed by a spring biased ball valve, the spring biased ball valve opened by an axial extension of the supply piston and which includes the piston opening.

14. The system in accordance with claim 13, wherein the piston opening includes a transverse opening communicating with a reservoir port.

15. The system in accordance with claim 14, wherein the pressure source means comprises a pump and accumulator, the pump receiving fluid from said reservoir means and communicating fluid pressure to the accumulator and regulator supply valve.

16. The system in accordance with claim 15, wherein said modulator means comprises decay valve means and isolation and built valve means.

17. The system in accordance with claim 11, wherein the supply valve includes a valve seat closed by a spring biased ball valve, the ball valve engageable by an extension of the supply piston.

18. The system in accordance with claim 11, wherein the supply piston includes sealing means thereabout.

* * * * *